UNITED STATES PATENT OFFICE.

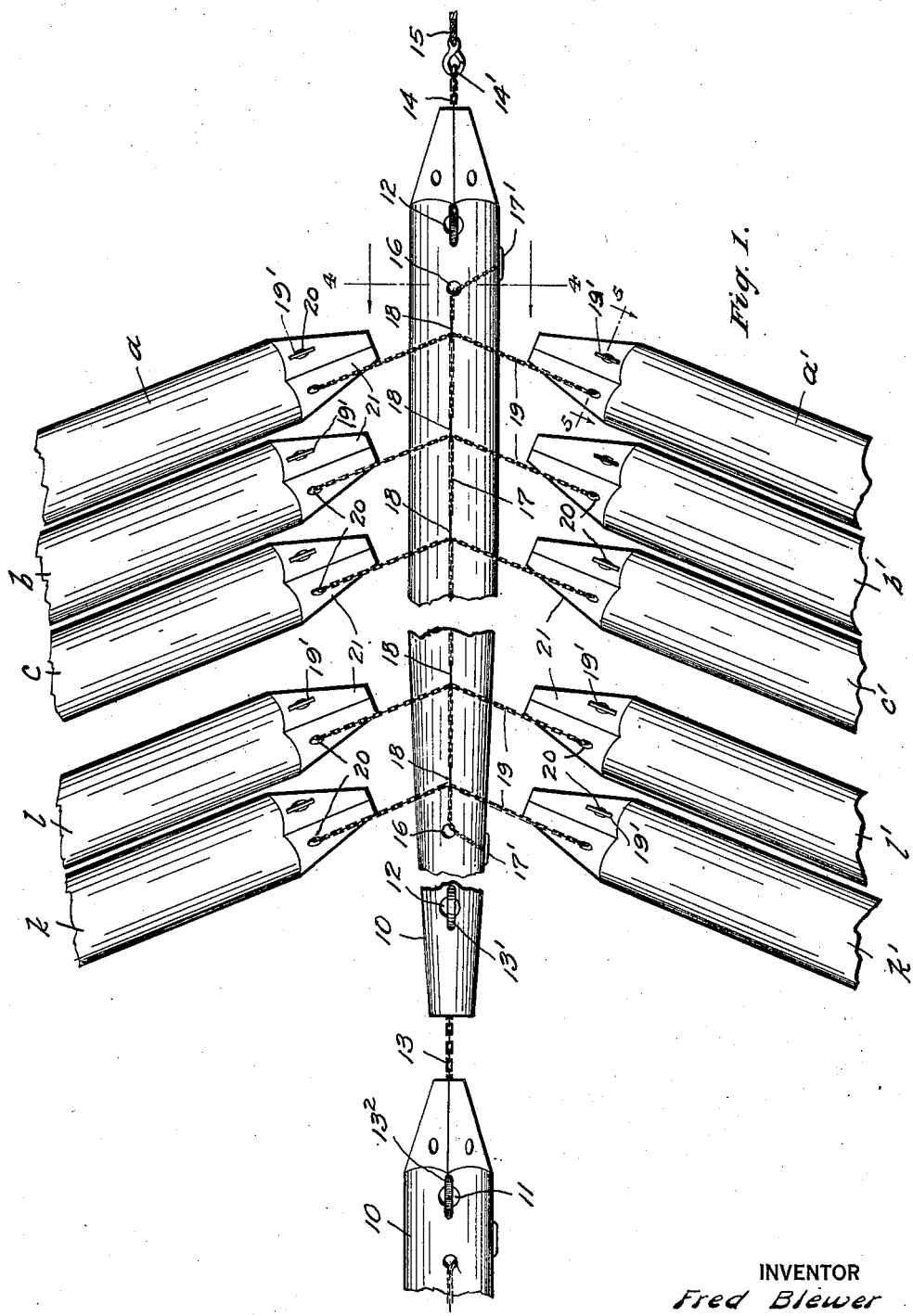

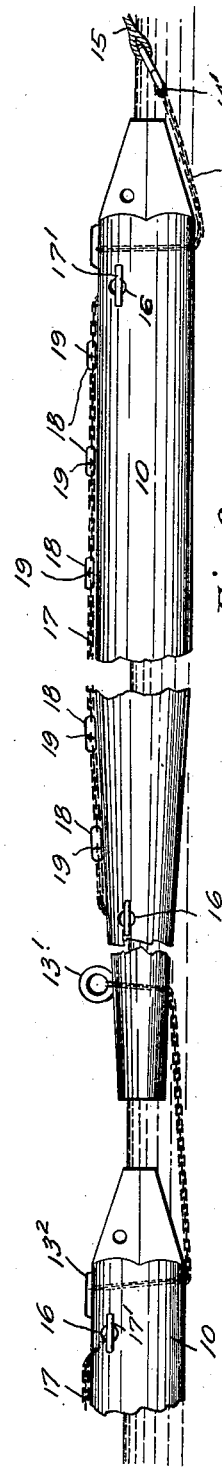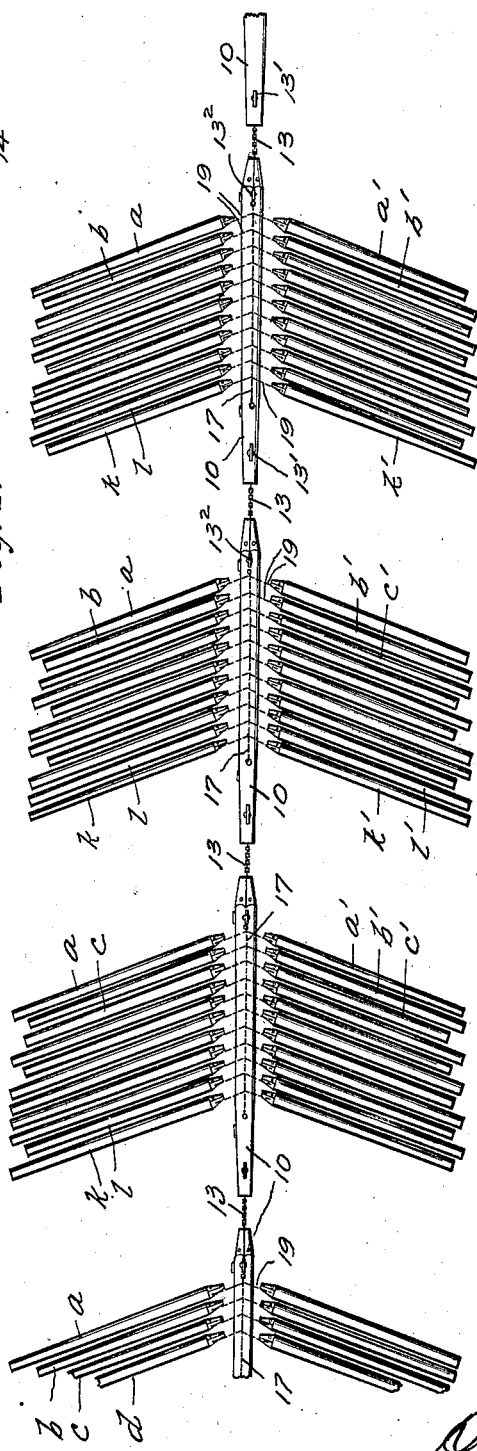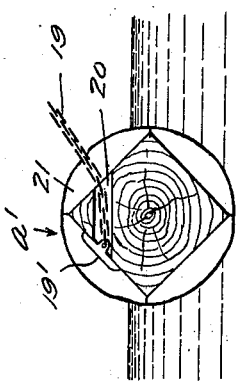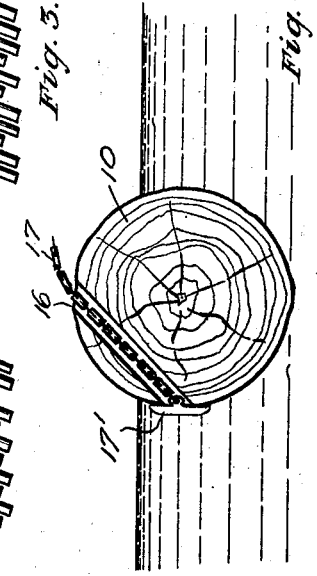

FRED BLEWER, OF PORT BLAKELY, WASHINGTON.

LOG-RAFTING APPARATUS.

1,343,429.  Specification of Letters Patent.  Patented June 15, 1920.

Application filed March 29, 1920. Serial No. 369,717.

*To all whom it may concern:*

Be it known that I, FRED BLEWER, a citizen of the United States, residing at Port Blakely, in the county of Kitsap and State of Washington, have invented certain new and useful Improvements in Log-Rafting Apparatus, of which the following is a specification.

This invention relates to log rafts and more especially to apparatus whereby logs may be conveniently connected and towed.

The object of the invention is the perfecting of apparatus of this character.

The invention consists in the novel construction, adaptation and combination of parts as will be hereinafter described and claimed. The invention is illustrated in the accompanying drawings, in which—

Figure 1 is a plan view shown partly broken away.

Fig. 2 is a side elevational view of the boom logs and chain connections thereon as shown in Fig. 1.

Fig. 3 is a plan view of a log raft composed of a plurality of sections embodying my invention.

Figs. 4 and 5 are detail sectional views through 4—4 and 5—5 of Fig. 1.

In carrying out my invention I employ a number of boom logs 10, hereinafter designated as "boom-sticks," having holes 11 and 12 bored diametrically therethrough adjacent to the sticks' ends.

Said boom-sticks are arranged for towing one in front of another, the adjacent sticks being coupled together by chains 13 extending upwardly through the respective holes and from which the chains are prevented from being accidentally withdrawn by the provision of a ring $13^1$ and a toggle $13^2$ on the opposite ends of a chain engaging the top surfaces of the respective sticks. The hole 12 of the foremost stick is utilized to receive a chain 14, to the ring $14^1$ of which is secured a hauling cable 15.

A boom-stick 10 is furthermore provided near its ends with holes 16 extending in inclined directions from about the mid-width of the top of the stick to one side of the same, as shown in Figs. 1 and 4.

Extending longitudinally of a boom-stick and supported upon the top thereof is a main chain 17 which is secured in place by having its ends passed through the holes 16 and with the toggles $17^1$ of the chain engaging a stick as shown in Figs. 2 and 4.

A chain 17 includes a plurality of spaced links 18 through each of which slidably passes a leader chain 19 provided at its ends with toggles $19^1$. Said leader chains are utilized to couple the logs to be towed in pairs, as $a$—$a^1$, $b$—$b^1$, etc., the complementary logs of each pair being disposed at opposite sides of the associated boom-stick. The leader chains are engaged to the logs after passing the respective toggles $19^1$ through log holes 20; with logs having pointed ends 21 (Figs. 1 and 5) as provided for piles, the holes 20, by preference are disposed in such ends as represented.

The leader receiving links 18 of the main chain are desirably spaced at distances apart approximating the diameters of the logs which are intended to be towed and when all of the leaders for a group of logs are employed the latter will extend outwardly at about the angles in which they are illustrated in Fig. 3. In going through a narrow channel, however, the alternate pairs of logs may be temporarily removed thereby enabling the logs to stream backwardly, so to speak, into closer relation with the associated boom-sticks. By securing the logs in the raft by the respective leader chains engaging the logs, the chains may be individually withdrawn to release selected logs.

The apparatus above described is simple, strong and durable in construction, is convenient to apply and efficient in operation.

What I claim, is—

1. In log-rafting apparatus, the combination of a main chain, a log serving as a support therefor and to which the ends of the chain are secured, a plurality of chains extending through the links of said main chain and affording leaders at opposite sides of the latter.

2. In log-rafting apparatus, the combination of a main chain, a flotative log for supporting the chain and to which the ends of the latter are secured, supplementary chains engaging in the main chain for movements transversely thereof, and log-engaging means provided on the extremities of said supplementary chains.

3. In log-rafting apparatus, the combination of a flotative boom log having holes bored therethrough adjacent to its ends, a main chain extending lengthwise on the top side of said log and passing through said holes, means connected to the ends of said chain to prevent the same being accidentally withdrawn from the boom log, and chains engaging in said main chain in spaced relations and affording log engaging leaders at opposite sides of the boom log.

Signed at Seattle, Washington, this 20th day of March, 1920.

FRED BLEWER.

Witnesses:
 PIERRE BARNES,
 ELIZABETH JOHNSON.